UNITED STATES PATENT OFFICE.

WILLIAM SCHILLING, OF BALTIMORE, MARYLAND, ASSIGNOR TO HIMSELF AND JESSE KLINEFELTER, OF SAME PLACE.

IMPROVEMENT IN THE MANUFACTURE OF SPIRITUOUS LIQUOR FROM TOMATOES.

Specification forming part of Letters Patent No. 31,058, dated January 1, 1861.

*To all whom it may concern:*

Be it known that I, WILLIAM SCHILLING, of Baltimore, in the county of Baltimore and State of Maryland, have invented a Process for Making Brandy from Tomatoes; and I do hereby declare that the following is a full, clear, and exact description of the principle or character which distinguishes it from all other things before known, and of the usual manner of making, modifying, and using the same.

My invention and discovery consist in a process of making brandy from tomatoes, described as follows: Mix in a tub one-quarter of a bushel of malt, four pounds of New Orleans sugar, with four or five gallons of water at the temperature of 150° to 160° Fahrenheit. In a separate tub mash well eight bushels of tomatoes, and after the contents of the first tub have stood about one hour mix them well by stirring with the mash, then add one quart of "stock yeast" at the temperature of about 80° Fahrenheit, and let the whole stand for three to four days, when it is ready for distillation, conducted in any suitable distilling apparatus after the usual manner of distilling other liquors, and the result of this process is an excellent brandy, of an agreeable aromatic flavor and possessed of all the remedial virtues that are claimed for the tomato and its other preparations.

I do not claim the exclusive right to make alcoholic liquors from tomatoes; but

What I claim as my invention and discovery is—

The above-described process for making brandy from tomatoes, not wishing to confine myself to the precise proportions of the ingredients used, nor to the exact degrees of heat specified, but to vary the same, as may be found necessary, without departing from the essential character and principles of said process.

WM. SCHILLING.

Witnesses:
   CHAS. G. PAGE,
   WM. H. MORRISON.